United States Patent [19]

Linke

[11] Patent Number: 5,191,219
[45] Date of Patent: Mar. 2, 1993

[54] INFORMATION PROCESSING APPARATUS INCLUDING A PLANAR OPTICAL WAVEGUIDE

[75] Inventor: Richard A. Linke, Princeton, N.J.

[73] Assignee: NEC Research Institute, Inc., Princeton, N.J.

[21] Appl. No.: 688,160

[22] Filed: Apr. 19, 1991

Related U.S. Application Data

[63] Continuation-in-part of Ser. No. 419,380, Oct. 10, 1989, abandoned.

[51] Int. Cl.⁵ .................... G02B 27/00; G02B 6/00
[52] U.S. Cl. ................... 250/551; 250/208.1; 250/227.31; 359/163; 385/14
[58] Field of Search ............... 385/24, 14; 357/19, 357/30; 250/551, 227.11, 227.24, 227.31, 208.1; 359/163

[56] References Cited

U.S. PATENT DOCUMENTS

| | | | |
|---|---|---|---|
| 4,422,088 | 12/1983 | Gefeller | 350/96.13 |
| 4,809,193 | 2/1989 | Jourjine | 385/14 |
| 4,871,224 | 10/1989 | Karstensen et al. | 385/14 |
| 4,966,430 | 10/1990 | Weidel | 385/14 |
| 5,009,476 | 4/1991 | Reid et al. | 385/14 |
| 5,054,870 | 10/1991 | Losch et al. | 385/14 |
| 5,061,027 | 10/1991 | Richard | 385/14 |

FOREIGN PATENT DOCUMENTS

| | | | |
|---|---|---|---|
| 0200642 | 11/1983 | Japan | 370/3 |
| 0015988 | 1/1985 | Japan | 350/96.11 |
| 0121014 | 6/1986 | Japan | 350/96.11 |

OTHER PUBLICATIONS

Balliet et al., "Optical Transmission System for Interconnecting Electronic Units", IBM Tech. Dis. Bull. vol. 26, No. 24, Sep. 1983, pp. 1793–1796.

Primary Examiner—David C. Nelms
Assistant Examiner—Michael Messinger
Attorney, Agent, or Firm—Arthur J. Torsiglieri

[57] ABSTRACT

An information processing system uses a planar optical waveguide as a shared medium for a plurality of its subsystems. To this end, each subsystem is provided with a light emitting diode to broadcast information pulses into the shared medium and a photodetector for receiving the information pulses broadcast by the light emitting diodes. This thereby reduces the need for conductive interconnections between subsystems. Additionally, a number of planar optical waveguides can be stacked on a support and different compositions of subsystems communicate with one another by using different waveguides of the stack. The system can be adapted for time-division, space-division and frequency division multiplexing.

15 Claims, 2 Drawing Sheets

INFORMATION PROCESSING APPARATUS INCLUDING A PLANAR OPTICAL WAVEGUIDE

RELATED APPLICATION

This application is a continuation-in-part of application Ser. No. 419,380 filed Oct. 10, 1989, now abandoned.

FIELD OF INVENTION

This invention relates to information processing apparatus involving use of optical waveguides for interconnection purposes.

BACKGROUND OF THE INVENTION

The ability to produce smaller and smaller feature sizes on semiconductor integrated circuits has provided dramatic increases in the speed and capacity of information processing apparatus over the past ten years. This advance has now been slowed, however, by the increasing importance of interconnections on the monolithic circuits themselves. For example, the reduction in size of the active components, such as transistors, has resulted in a situation where more than half of the surface area is devoted to metallic interconnection lines. Also, since the input capacitance of the transistors has been significantly reduced, the capacitance of these lines can be the dominant reactance which slows the response of the circuit.

Previously proposed solutions to these problems often involve the use of optical interconnections. Typically, such proposals require the use of optical waveguide ("optical wiring") to replace the conventional electronic wiring. While this technique does provide, in principle, some advantages over electronic interconnections, it does not solve the problem of simplifying the complex wiring pattern required by circuits with very large numbers of active elements. The present invention provides a means for forming interconnections using optical signals that does not require complex optical wiring patterns.

SUMMARY OF THE INVENTION

A feature of the invention is the use of a planar optical waveguide which extends non-selectively between the inputs and outputs of the many subsystems to be interconnected. In a typical embodiment of the invention, this planar guide serves as a two dimensional shared medium or common bus interconnecting the various subsystems which are arranged in a two dimensional array along the planar guide. In operation, either on a time division and/or frequency division basis, selected subsystems are actuated in turn to a transmitting mode for broadcasting, via an output port into the shared medium planar optical waveguide, information preferably in the form of packets of digital optical signals. Moreover, these signals in turn are picked up selectively by those subsystems that are in an appropriate receiving mode via their input ports for processing by the subsystems and possible rebroadcast, after processing, back into the shared medium for further processing in other subsystems. The broadcast information can be delivered selectively from transmitting subsystems to desired receiving subsystems either by including an address in the packet of optical pulses that alerts an addressed subsystem and energizes it to a receiving mode. Alternatively, a control system can be used to provide appropriate clock pulses to control electrically the appropriate synchronization of the transmitting and receiving modes of the various subsystems. As another alternative the wavelength of the optical pulses transmittal are selected to energize selectively desired subsystems for receiving the pulses.

In apparatus of this kind, each subsystem that will need to transmit signals to other subsystems is provided at its output port with a suitable source for broadcasting optical signals into the shared medium and each subsystem that will need to receive signals in the shared medium from other subsystems is provided at its input port with a suitable receiver for extracting from the shared medium optical signals addressed to it for processing.

In one embodiment of apparatus of this kind, the original information to be processed is introduced as an electrical signal into the first or input subsystem that is using the shared medium and the processed information is extracted as an electrical signal from the last or output subsystem that is using the shared medium.

In an alternative embodiment, the original information to be processed is broadcast as optical signals by irradiating appropriately one or more photodiodes that serve as inputs to the plurality of subsystems using the shared medium. Moreover, the output information of the apparatus can be derived either as optical signals from light-emitting diodes or diode lasers, especially of the vertical-emitting type, supplied by selected subsystems using the shared medium or as electrical signals derived from the outputs of selected subsystems using the shared medium.

The invention can be applied to a wide variety of signal processing apparatus by appropriate choice of the subsystems included.

In one aspect, an information processing apparatus in accordance with the invention may be viewed as a miniature local area network on a common support or substrate using a planar optical waveguide as the shared medium or common bus and a plurality of light emitting and light detecting elements positioned along the planar waveguide for coupling together the various subsystems, may be viewed as belonging to stations of the local area network.

The invention will be better understood from the following more detailed descriptions taken in conjunction with the accompanying drawing.

BRIEF DESCRIPTION OF THE DRAWING

Similarly.

DETAILED DESCRIPTION

Figure 1:
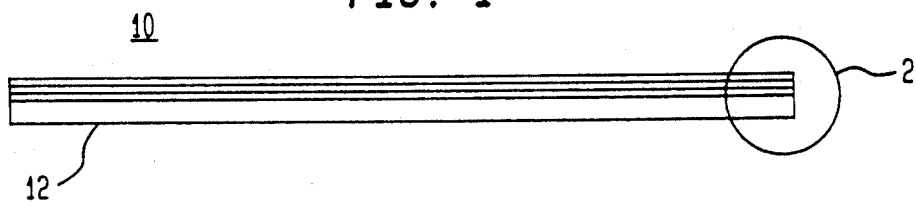
FIG. 1 shows in cross section a multilayer wafer that incorporates an array of subsystems that are interconnected by a planar optical waveguide in accordance with the invention.
Figure 2:
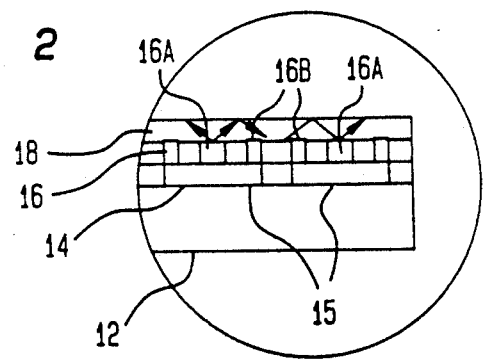
FIG. 2 is an enlargement of a portion of FIG. 1 to show increased detail of the multilayers.

With reference now to the drawing, FIG. 1 and 2 illustrates the details of the multilayer wafer 10 that forms an information processing apparatus in accordance with the invention. As shown, the wafer 10 is circular shape, and typically will have a diameter of several inches. It includes a number of layers shown in more detail in FIG. 2.

Figure 3:
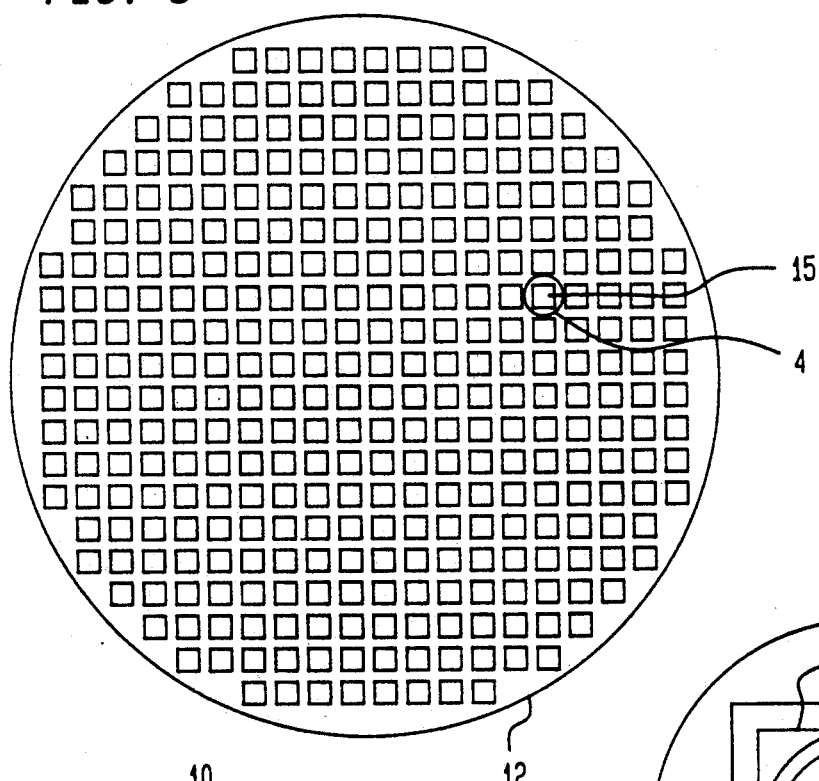
FIG. 3 is a top view illustrating the arrangement of the subsystems on the wafer shown in FIG. 1.

As seen in FIG. 2, the wafer comprises a relatively thick substrate layer 12 of any suitable material and of a thickness to provide mechanical support for the wafer. Overlying layer 12 is a layer 14 that provides the various subsystems that are to be interconnected. As shown, the subsystems are individual chips 15. The individual chips are arranged in layer 14 in a two dimensional array, typically packed as seen in FIG. 3, to employ the surface area efficiently. Advantageously, the power and ground buses of the various chips are provided by an appropriate pattern of metallic conductors (not shown) on the substrate 12. Because these conductors largely will not be carrying signal currents but only the powering currents, they may be very simple patterns. Overlying the layer 14 is a layer 16 that provides the light emitting elements 16A and the light detecting elements 16B associated with the subsystems, as seen in FIG. 2, that are used to communicate optically between the various subsystems. Such elements will be discussed in more detail later.

Overlying layer 16 is the layer 18 that provides the planar or two dimensional optical waveguide that serves as the transmission medium shared by the various light sources and light detectors of layer 16 for communicating between the various subsystems. This layer 18 is designed to confine light to propagation within the plane. The guide is designed to support one or more nodes of the optical field in the dimension perpendicular to the plane, corresponding to the analogous cases of single and multi-mode cylindrical waveguides. Light waves propagate in the plane in much the same way that radio waves travel along the surface of the earth. Optical signals coupled omnidirectionally into the planar waveguide at any point therealong are broadcast to every receiving element, or photodetector, along the planar waveguide.

Advantageously, the planar waveguide layer 18 may be unpatterned and it may be of any suitable material, such as silica, deposited over layer 16, or a semiconductor with an appropriately wide band gap to keep propagation loss low. To avoid standing wave patterns, the edges of the wafer advantageously are made non-reflective so that incident light is absorbed rather than reflected. Coupling of the light from the sources into the waveguide may be made more efficient by using perturbations in the waveguide.

Alternatively, the planar optical waveguide layer may be deposited initially on the substrate providing the mechanical support and the layer including the light sources and photodetectors and the layer including the subsystems disposed in turn over the waveguiding layer. The conductors for powering the subsystems and the light sources and photodetectors then disposed in a layer overlying the subsystem layer.

FIG. 3 shows a typical pattern for the arrangement of the subsystems 15 within the wafer 10. As seen, the arrangement includes several hundred subsystems in a symmetric two dimensional array. The subsystems may be memory chips, multiprocessor chips, or other suitable electronic circuit. When the state of the technology permits the subsystems may be incorporated as discrete portions of a large single silicon wafer suitably isolated electrically from one another.

Figure 4:
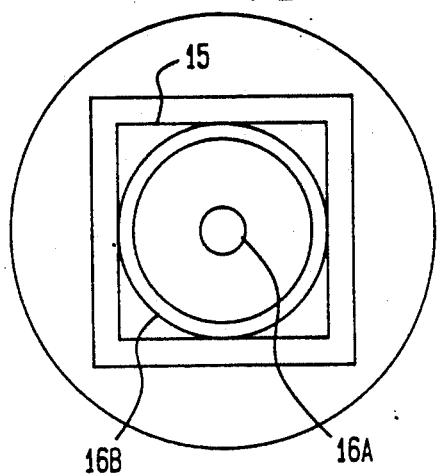
FIG. 4 is an enlargement of a portion of FIG. 3 to show increased detail of a subsystem and its associated light emitting source and light detector.

FIG. 4 illustrates on an enlarged scale a possible arrangement of a subsystem chip 15 and its associated light emitting element 16A, and light detecting element 16B. As shown the light emitting element 16A, which may a light emitting diode (LED), is essentially a point source near the center of the subsystem and the light detecting element 16B, or photodetector, has a ring-like configuration surrounding the light source.

In the usual case, a light source should act as a point source introducing light into the adjacent planar waveguide so that it is broadcast to every receiving element. In some cases, it may be preferably to couple the light in a fashion to provide some directional control of its propagation in the planar waveguide. For example, it may be desirable to limit the propagation of the light from sources positioned along the edge regions of the wafer in the direction towards the near edge of the wafer where the incident light would be wasted by absorption.

At the present stage of the technology, the electronic components, such as the light sources and photodetectors are best formed as individual components and then included as separate elements in a layer of suitable passive material. At some future date when the technology permits these components might be formed in situ in an appropriate layer. For example, the subsystems might all be formed in a monocrystalline layer of silicon or gallium arsenide, and the light sources and detectors formed in a monocrystralline layer of gallium arsenide. Moreover, either of these layers might be formed as an epitaxial layer grown over the other of the layers.

There are three dominant factors which determine the fraction of transmitted power that is detected by a particular receiver: geometry, progapation loss, and waveguide-to-detector coupling strength. Broadcasting from a point source in two dimensions results in a received signal strength which is proportional to the angle, $\theta$, subtended by the detector at a distance L from the source. The detected signal strength will fall as $1/L$, unlike the case of broadcasting in three dimensions, where the signal strengths fall as $1/L^2$. For a detector diameter d, and a wafer diameter D, the smallest subtended angle is:

$$\theta_{min} \sim d/D.$$

A 1 millimeter diameter detector at the maximum distance from a source on a 4-inch wafer results in a signal spreading loss of about 25 dB.

Since the amount of light captured and the signal strength depends on the detector linear dimensions in the direction to capture light while the detector's capacitance (and therefore its bandwidth) depends on its area, the geometry of the detector should be appropriate to minimize area, such as a ring or an "X". Also, the detector must be only weakly coupled to the waveguide to avoid shadowing other detectors, as discussed below.

Propagation loss, in a well designed waveguide, will be dominated by the signal absorbed by other detectors along the path from a source to a desired detector. In the example, when a light source and a detector are at maximum separation, i.e. at opposite ends of a diameter with n elements along such path, the signal must pass $(n-1) \sim D/d$ detectors to cross the wafer. If the coupling between the waveguide and the detectors is set such that the fraction, C, of guided light passing a detector is absorbed (C<1), then the portion of the transmitted light arriving at the nth detector is $$(1-C)^n.$$

Since the coupling into the nth element is also C, the detected signal will be proportional to $$C(1-C)^n.$$

The coupling strength which maximizes the signal in the last detector is just $$C = 1/n,$$

so that the detected signal is given by $$P_{det} = P_{trans}(\theta/2\pi)(1/n)(1-1/n)^n.$$

For n larger than a few, the last term becomes $$(1-1/n)^n \to 1/e$$

and the minimum detected power is $$P_{det} = P_{trans}(d/D)^2/(2\pi e).$$

Finally, for the geometry considered here, this becomes $$P_{det} = (P_{trans}/8e)(1/N).$$

Detectors nearer to the transmitter will receive a significantly stronger signal. The maximum detected signal is given by $$P_{det} = (P_{trans}/2\pi)(1/N)^{\frac{1}{2}}$$

so that the dynamic range (ratio of maximum to minimum signal strengths) encountered at the receiver is $$R = (4e/\pi)(N)^{\frac{1}{2}}.$$

In an alternative embodiment, a wafer of the kind described can be modified to operate as an array of "smart pixels". In such an embodiment, the information to be processed is prepared as an image or optical pattern that is projected on a surface of the wafer in a manner to excite photodetectors associated with selected subsystems and in this manner to provide an input signal, to each such selected subsystem. After processing in the selected subsystem, the processed signal is introduced via a light emitting diode associated with such subsystem into a shared waveguiding medium for transfer to other selected subsystems by way of their associated photodetectors. Moreover, after processing is complete, the output information signal may be transferred out of the wafer either as an electrical signal or as an optical pattern by an array of light emitting diodes in various ways. The resulting output information image can serve as an input information image to a succeeding stage of similar form for further processing.

Figure 5:
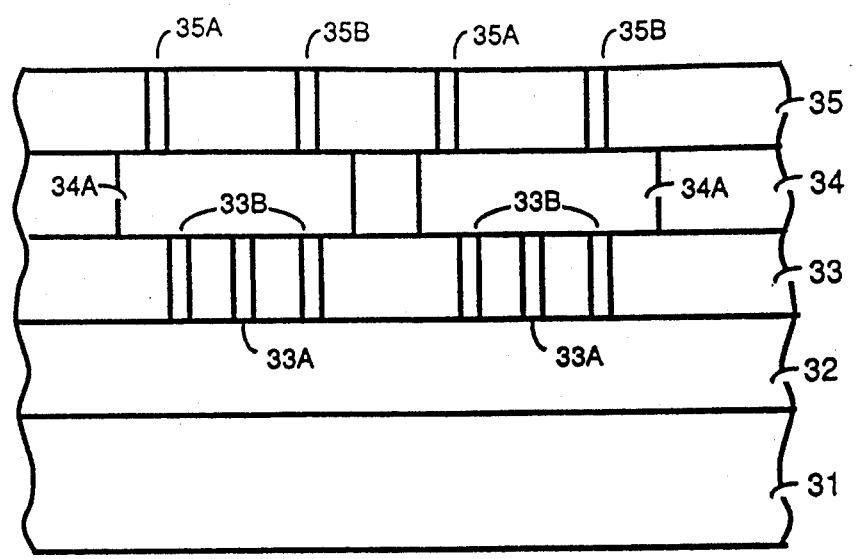
FIG. 5 and FIG. 6 show fragments of wafers representative of alternative embodiments of the invention.

FIG. 5 shows apparatus 30 of this kind. It includes a support member 31 on which has been deposited a planar waveguide 32 of the kind previously described. Over the planar waveguide layer 32, there extends layer 33 within which are included the light sources 33A and photodetectors 33B that are associated with the subsystems formed by the semiconductive chips 34A included in layer 34. Outerlayer 35 includes a different set of light emitting sources 35A and photodetectors 35B.

The original information optical image is used to excite the set of input photodetectors 35B, whose electrical outputs serve as inputs to the various subsystems 34A whose electrical outputs are used as inputs to the light-emitting sources 33A in layer 33. These sources supply optical pulses into the waveguiding layer 32 that serves as a shared transmission medium and these optical pulses are captured by selected photodetectors 33B for use in the subsystems 34A they supply. After processing, the subsystems are used to excite appropriate light-emitting sources 35A at the top surface, whereby there is formed at such top surface a processed pattern of pixels, as desired. In this embodiment, the top surface serves both to receive the input optical pattern to be processed but also ultimately to provide the output optical pattern after processing.

Figure 6:
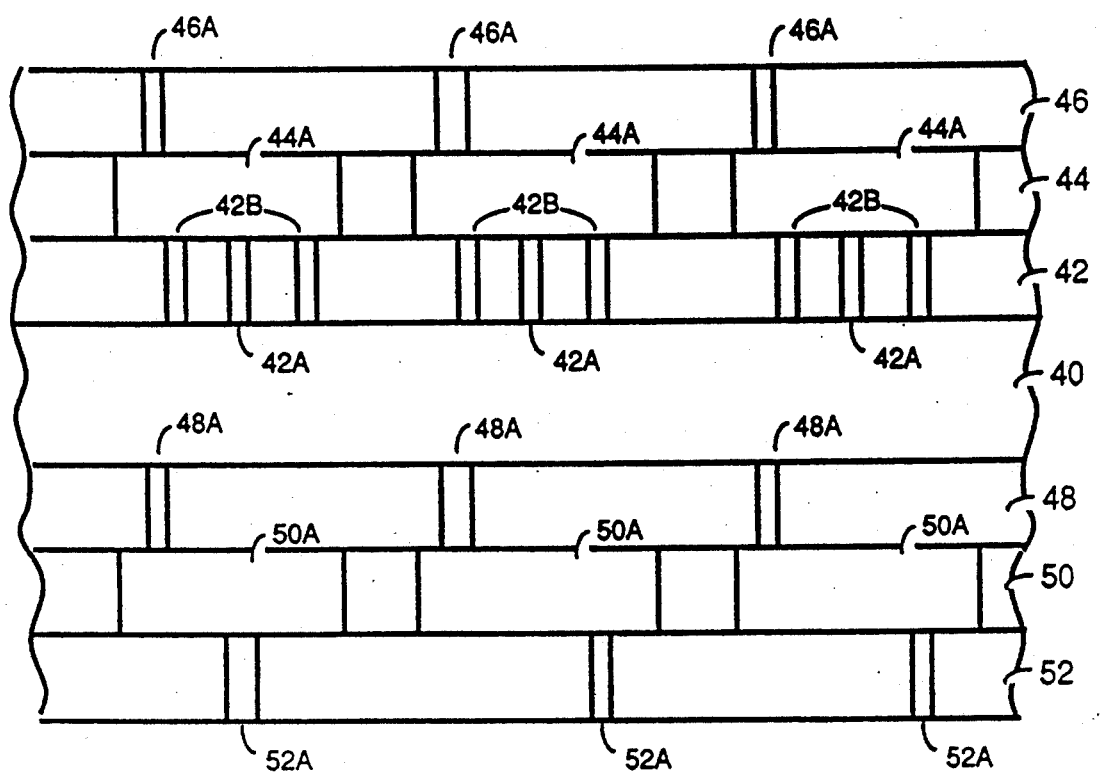

In FIG. 6 there is shown an alternative embodiment in which the input optical pattern and output optical pattern are on opposite surfaces. In this embodiment, intermediate layer 40 serves as the substrate providing mechanical support and also treated to serve as the shared waveguide medium.

Contiguous to one of the major surfaces of layer 40 is a layer 42 in which are included sources 42A and detectors 42B to serve the roles previously described. Over layer 42 is the layer 44 in which are incorporated subsystems 44A to operate in the manner previously described. Over layer 44 is the layer 46 in which are incorporated the photodetectors 46A. These serve to detect the input optical information pattern and to supply corresponding electrical signals as inputs into subsystems 44A.

On the opposite major surface of layer 40, there is deposited a layer 48 in which are included photodetectors 48. These can be used to abstract optical patterns that have been processed and to use these to provide electrical signals to subsystems 50A incorporated in the adjacent layer 50. These subsystems process the electrical signals further, such as by amplification, and eventually excite the optical sources 52A, incorporated in surface layer 52 to provide the output optical pattern. Layers 50 and 52 can be largely of a passive dielectric material.

It can be seen that a number of additional variations are possible. For example, layer 50 can be provided also with light sources to provide optical coupling in the manner of layer 42 between subsystems 50A if further processing. It should be apparent that a wide variety of applications may be devised for the invention by appropriate choice of the subsystem functions. It should also be apparent that the optical waveguide may for some applications be divided into discrete portions, each of which would act as a separate shared medium in space division for one of a plurality of groups, each group comprising a plurality of subsystems that are to be interconnected as described above.

In some instances, it may be preferable to achieve a degree of space division multiplexing by stacking several optical waveguiding layers on a common support. Then an individual subsystem light sources would be adopted to introduce optical signal information into a selected one or more such layers for communications with particular subsystem photodiodes coupled to the selected layers. In this fashion, communication between subsystems could be controlled. It should also be apparent that frequency division multiplexing can be achieved by having different subsystem light sources introduce light of different wavelengths into a shared waveguiding medium for communicating with particular subsystem photodiodes tuned to accept a particular wavelength of those involved.

Additionally, it should also be feasible to combine space division multiplexing by the use of a plurality of stacked optical waveguiding layers with frequency division multiplexing by using light sources and photodiodes operating at a plurality of different wavelengths as described. It can also be appreciated that the frequency division multiplexing can be achieved either by having different light sources emit at different wavelengths or by switching the wavelengths of a given light sources between different wavelengths. In such apparatus, it may be advantageous to employ injection diode lasers as the light-emitting sources because of the better wavelength control available. Injection diode lasers might also be used in the basic form of apparatus first described. When lasers are used as the light-emitting sources, it should be feasible to introduce the information to be transferred as frequency or phase modulation on the laser light. This permits another approach to the transmission of the signal information selectively to a desired subsystem since different modulation bands can be used to transmit to different subsystems such subsystems being tuned to receive the appropriate band.

What is claimed is:

1. Information processing apparatus comprising
   means for forming a planar optical waveguide which extends in two dimensions and serves as a shared medium,
   a plurality of light-emitting means and a plurality of light-detecting means extending in a two dimensional arrangement along said planar optical waveguide for broadcasting omnidirectional light signals and abstracting light signals, respectively, into and from said planar optical waveguide, one surface of each light emitting means and one surface of each light detecting means being substantially aligned with one surface of the two-dimensional planar optical waveguide to form a substantially smooth surface, and
   a plurality of subsystems comprising at least several hundred semiconductive integrated circuit chips that are to be interconnected optically by way of the shared medium, both including input and output ports for processing the light signals in the shared medium, the light-detecting means being coupled to input ports and the light emitting means being coupled to output ports of the subsystems.

2. Information processing apparatus in accordance with claim 1 which includes a plurality of planar waveguiding means stacked separately on the support means, and the plurality of light-emitting means and the plurality of light-detecting means include a first group of light-emitting means and light-detecting means that communicate with one another by way of one of the plurality of planar waveguiding means and at least a second group of light-emitting and light-detecting that communicate with one another by way of a different one of the plurality of planar waveguiding means.

3. Information processing information in accordance with claim 1 in which the light-emitting means and the light-detecting means are so positioned along and coupled to the planar optical waveguide that each of the light-detecting means is able to capture from the planar optical waveguide significant amount of light introduced into the waveguide from each of the light-emitting means.

4. Information processing apparatus in accordance with claim 3 in which the subsystems are integrated circuit chips and the couplings of the light-detecting means to the planar waveguide and the amounts of light-emitted by the light-emitting means into the planar waveguide are such that the amounts of light captured by the light-detecting means are adequate for the operation of said integrated circuit chips.

5. Information processing apparatus in accordance with claim 1 in which various ones of the light-emitting means are means for operating at different wavelengths for communicating selectively with light-detecting means for receiving said wavelengths.

6. Information processing apparatus in accordance with claim 1 in which the apparatus comprises a stack of contingous layers of which one layer includes the planar optical waveguide, another layer includes the light-emitting means and the light-detecting means, and another layer includes the plurality of subsystems, the layer including the light-emitting means and light-detecting means defining one substantially planar surface that essentially forms one surface of the layer forming the planar optical wave guide.

7. Information processing apparatus accordance with claim 1 in which the light-emitting means emit optical pulses that include an address of any subsystem for which said optical pulses are intended and any addressed subsystem is includes means for receiving said optical pulses.

8. Information processing apparatus in accordance with claim 1 which further includes an input array of light-detecting means coupled to the plurality of subsystems for receiving an input pattern of optical signal information for processing by the subsystems, and an output array of light-emitting means coupled to the plurality of subsystems for emitting an optical pattern of output signal information after processing by the subsystems.

9. Information processing apparatus comprising support means having a major planar surface portion, means forming an optical waveguiding means over said planar surface portion for providing a shared medium, and a plurality of smart pixel means spaced apart in a two dimensional arrangement over said shared medium and positioned for interconnection with one another optically by way of said shared medium.

10. Information processing apparatus comprising
    means forming a planar optical waveguide which extends in two dimensions and serves as a shared medium
    a plurality of light-emitting means and a plurality of light-detecting means extending in a two dimensional arrangement along said planar optical waveguide for broadcasting omnidirectional light signals and abstracting light signals, respectively, into and from said planar optical waveguide, and
    a plurality of subsystems each including input and output ports for processing the light signals in the shared medium, the light-detecting means being coupled to input ports and the light emitting means being coupled to output ports of the subsystems,
    further characterized in that each of said subsystems comprises an integrated circuit chip on a common surface of which are positioned the light-emitting means as a point source and the light detecting means as a ring surrounding the point source.

11. An information processing system in accordance with claim 10 in which the plurality of the subsystems comprises at least several hundred subsystems.

12. An information processing apparatus according to claim 10 in which said common surface of each integrated circuit chip forms a common surface with a surface of the planar optical wave guide.

13. An information processing apparatus comprising means for forming a two-dimensional planar optical waveguide which includes a parallel pair of substantially planar reflective surfaces and which serves as a shared medium, at least several hundred subsystems that are to be interconnected optically by way of the shared medium, each subsystem including an input signal port and an output signal port, each input signal port being coupled to a light-detecting means and each output signal port being coupled to a light-emitting means, one surface of each light emitting means and one surface of each light detecting means being substantially aligned with one surface of the two-dimensional planar optical waveguide to form a substantially smooth surface, and each light emitting means broadcasting light two dimensionally in the optical waveguide.

14. The information processing apparatus of claim 13 in which each light emitting means is essentially a point source and each light detecting means is a ring surrounding a point source.

15. The information processing apparatus of claim 13 which comprises a stack of contiguous layers of which one layer is a silicon wafer on one surface of which are included said subsystems, another layer of which includes said light emitting means and light detecting means, and another layer of which includes said optical wave guide.

* * * * *